April 21, 1925.
O. BENSON
HEADLIGHT MOUNTING
Filed April 21, 1924
1,534,352
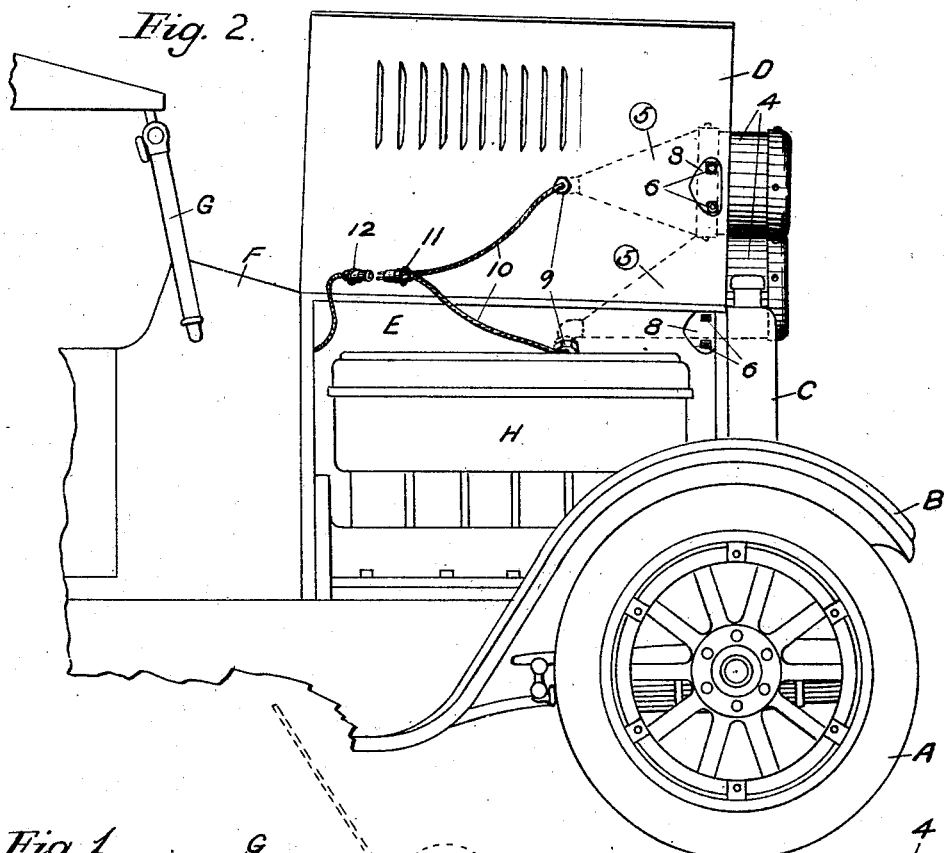
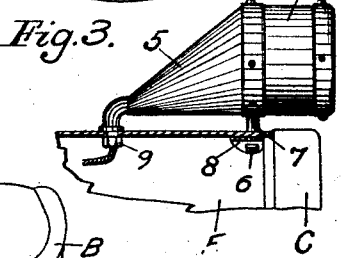
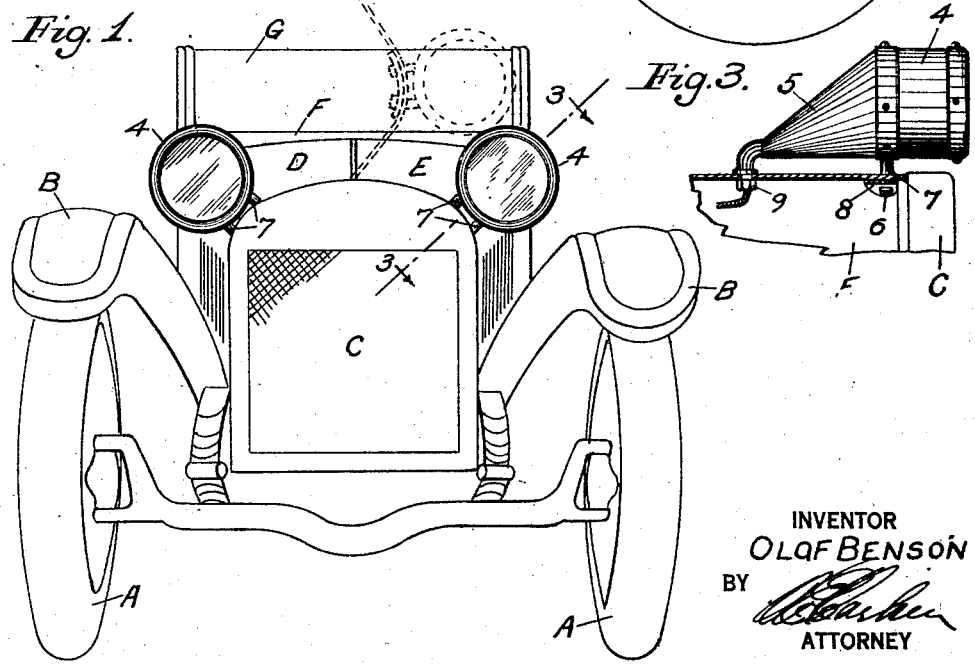
INVENTOR
OLOF BENSON
BY
ATTORNEY Patented Apr. 21, 1925.

1,534,352

UNITED STATES PATENT OFFICE.

OLAF BENSON, OF RED WING, MINNESOTA.

HEADLIGHT MOUNTING.

Application filed April 21, 1924. Serial No. 707,841.

*To all whom it may concern:*

Be it known that I, OLAF BENSON, a citizen of the United States, residing at Red Wing, in the county of Goodhue and State of Minnesota, have invented certain new and useful Improvements in Headlight Mountings, of which the following is a specification.

This invention relates to headlights for automobiles and other motor vehicles and the main object is to provide a novel, efficient and practical construction of headlight casing and means for mounting it on the vehicle, whereby certain advantages, later to be described, will be had. Further and more specific objects will be disclosed in the course of the following specification, reference being made to the accompanying drawing, in which:

Fig. 1 is a front elevation of an ordinary automobile embodying my invention.

Fig. 2 is a right side elevation of the front portion of an automobile, as seen in Fig. 1, but with the right half of the hood raised in an open position.

Fig. 3 is a detail elevation of one of the improved headlights, showing the adjacent portion of the hood, on which it is secured, in section, substantially as on the line 3—3 in Fig. 1.

Referring to the drawing more particularly and by reference characters, A designates the front wheels of a motor vehicle having fenders B, radiator C, hood sections D and E, a cowl F, wind shield G, and an engine or motor H, all of which are of common and well known construction.

Heretofore it has been almost universally customary to mount the main headlights of the vehicle at the sides of the radiator C and below the level of the tops of the fenders B, the lights being usually supported by rods or brackets extending from the main frame of the car. In this position, however, the light lenses become dirty very rapidly, due to their proximity to the ground, and a further objection is that the lights, thus arranged, are rigidly secured and cannot be removed with a minimum amount of effort, which is often desired for instance when working on the engine.

These objections I overcome by respectively fastening the two headlights upon the hood sections D and E, of the car. Thus, when the hood is removed, so that access may be had to the motor, the lights will be removed with them, and will of course be entirely out of the way until the hood is again replaced on the car.

Each of the lights, proper, consists of a drum or cylindrical casing 4, from the rear end of which extends a rigid cone or tapered portion 5. The drum portion 4 is secured by a pair of bolts 6 to the hood section D (or E), and is spaced therefrom as by tubular members 7, carried by the bolts. A small plate 8 is preferably interposed between the underside of the hood and the nuts of the bolt so as to rigidly and securely fasten the drum on the hood. The primary object of the cone 5 is to serve as a brace for the light, its smaller end being rigidly secured to the hood, as by a nut 9, at a point considerably rearward of the fasteners 6—7—8. This rearward tapering of the cone 5 also serves to decrease the frictional resistance of the wind, as is well known for instance in the art of aeronautics, and also gives the headlight a stream line appearance which harmonizes it with the lines and appearance of the automobile.

The cones 5 are open or hollow, so as to contain and conceal the light cables 10, for the lights, and these cables extend through the nuts and are joined under the hood in a connector member 11, which is detachable with respect to a second connector member 12, so that the cables may be separated when the hood and lights are to be removed.

It is understood that suitable modifications may be made in the general design and structural details of the invention, as herein shown and described, provided, however, that such modifications come within the spirit and scope of the appended claims.

Having now therefore fully shown and described my invention, what I claim to be new and desire to protect by Letters Patent is:

1. The combination with the hood of a motor vehicle, of a pair of headlights secured to the forward end of the hood, each of said headlights having a rearwardly tapered extension rigidly fastened to the hood, and circuit cables extending from the lights, through said extensions and under the hood.

2. The combination with the hood of a motor vehicle, of a pair of headlights secured to the forward end of the hood, each of said headlights having a rearwardly tapered extension rigidly fastened to the hood, circuit cables extending from the lights, through said extension and under the hood, and means whereby the cables may be readily disconnected when the hood and lights are to be removed from the vehicle.

In testimony whereof I affix my signature.

OLAF BENSON.